United States Patent
Wingert et al.

(10) Patent No.: US 8,677,504 B2
(45) Date of Patent: Mar. 18, 2014

(54) METHOD AND APPARATUS FOR ENCRYPTING/DECRYPTING MULTIMEDIA CONTENT TO ALLOW RANDOM ACCESS

(75) Inventors: Christopher Wingert, Del Mar, CA (US); Pooja Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1585 days.

(21) Appl. No.: 11/182,088

(22) Filed: Jul. 14, 2005

(65) Prior Publication Data

US 2007/0016802 A1 Jan. 18, 2007

(51) Int. Cl.
*G06F 21/00* (2006.01)

(52) U.S. Cl.
USPC ............................................. 726/27; 380/201

(58) Field of Classification Search
USPC .............. 726/26, 27; 380/200, 201, 209, 210, 380/216, 217, 236, 237
See application file for complete search history.

(56) References Cited

U.S. PATENT DOCUMENTS

| | | | |
|---|---|---|---|
| 2002/0006165 A1* | 1/2002 | Kato | 375/240.25 |
| 2003/0188182 A1 | 10/2003 | Sato et al. | |
| 2004/0088557 A1* | 5/2004 | Malcolm et al. | 713/193 |
| 2005/0036876 A1 | 2/2005 | Walto et al. | |
| 2007/0180534 A1 | 8/2007 | Ishizaka et al. | |

FOREIGN PATENT DOCUMENTS

| | | |
|---|---|---|
| CN | 1463544 A | 12/2003 |
| EP | 1122728 A | 8/2001 |
| EP | 1379084 A1 | 1/2004 |
| JP | 2001211164 A | 8/2001 |
| JP | 2002152180 A | 5/2002 |
| JP | 2003319322 A | 11/2003 |
| JP | 2004511931 A | 4/2004 |
| JP | 2004282703 A | 10/2004 |
| JP | 2005109861 A | 4/2005 |
| JP | 2005533416 A | 11/2005 |
| KR | 20037921 | 1/2003 |
| TW | 589569 | 6/2004 |
| TW | 589820 | 6/2004 |
| WO | WO0232147 | 4/2002 |
| WO | 03/107664 A | 12/2003 |
| WO | 03/107665 A | 12/2003 |
| WO | WO2004006559 A2 | 1/2004 |

OTHER PUBLICATIONS

G. Kim, D. Shin: "Intellectual Property Management on MPEG-4 Video for Hand-Held Device and Mobile Video Streaming Service" IEEE Transactions on Consumer Electronics, Feb. 2005, XP002404847.

(Continued)

*Primary Examiner* — Edward Zee
(74) *Attorney, Agent, or Firm* — Arent Fox LLP

(57) ABSTRACT

A method is disclosed for encrypting a multimedia file including parsing the multimedia file to identify a media data portion; encrypting the media data portion; and, combining the encrypted media data portion with a non-encrypted non-media data portion. A method is also disclosed for playing a multimedia file including parsing the multimedia file to identify an unencrypted metadata portion; using the unencrypted metadata portion to locate a position of interest in the media file, the position of interest having an associated encrypted media data portion; and, decrypting the associated encrypted media data portion. An apparatus for performing the methods is also disclosed herein.

45 Claims, 6 Drawing Sheets

(56) References Cited

OTHER PUBLICATIONS

D. Singer, W. Belknap: Text for ISO/IEC 14496-1/PDAM1 (MPEG-4 version 2 Intermedia Format—MP4) ISO/IEC JTC 1/SC 29/WG 11 N2739 Subpart 4, Mar. 1999, XP 002404848; Para 6.1.1-Para 6.3.2, p. 14; Para 6.3.1-6.3.2; Para 6.3.15; Para 6.3.16.1; para 6.3.20; p. 41, lines 16-19.

Dongkyoo Shin et al., "A study on the Digital Right Management of MPMG-4 Streams for Digital Video Library," 2003, pp. 444-455.
International Search Report and Written Opinion—PCT/US2006/027461, International Search Authority—European Patent Office—Nov. 13, 2006.
Translation of Office Action in China application 2006-80032332 corresponding to U.S. Appl. No. 11/182,088, citing CN1463544 dated Jan. 25, 2011.

* cited by examiner

*-PRIOR ART-*

--PRIOR ART--

METHOD AND APPARATUS FOR ENCRYPTING/DECRYPTING MULTIMEDIA CONTENT TO ALLOW RANDOM ACCESS

BACKGROUND

1. Field

Embodiments of the invention relate generally to encryption and decryption of multimedia files, and more particularly, to a method and apparatus for encrypting/decrypting multimedia content to allow random access.

2. Background

As 3G and other cellular networks are deployed, new IP packet data based services are emerging. One of the most challenging service areas operators are seeking to exploit involves the distribution of video content to the mass market. High-quality video is the most data-intensive type of content. At the same time, consumer experience with current home viewing options presents operators and content providers with target markets that hold established ideas about what the user experience should be. The combination of consumer expectations and mobility present fundamental challenges to network operators and content providers. In summary, attractive business models, network control and management, access control, device capabilities and a compelling user experience combine to present a complex of interdependent challenges that have not been fully resolved in the wireless industry.

One challenge that has arisen is the need to provide protection of the content that is to be distributed. For example, the distributed content typically needs to be guarded from unauthorized copying. Further, content providers also wish to control, either directly or indirectly, the distribution of the content. Thus, content providers typically require that any content distribution system used by service providers have the ability to provide digital rights management (DRM), which refers to any of several technical arrangements that provide control for how distributed material can be used on any electronic device with such measures installed. An critical underlying component for all content distribution systems to support DRM so as to protect the intellectual property rights of content providers is the feature of encryption/decryption of media during transmission/receipt. In addition, there is often a requirement to store the media in an encrypted form, either on the servers at the distribution center or on the playback device. Further, the encryption often needs to support "trick" features such as the ability to view the content during fast-forward and rewind playback. It is desired that the media encryption solution should provide encryption with minimal changes to video coding interface.

SUMMARY

Embodiments described herein provide methods and apparatus for encrypting only the video data of any codec transport stream and leaving the meta-content intact. Thus, any error, byte expansion or contraction of data will be minimized to affect a small portion of the playback of the multimedia In one embodiment, a method is described herein for encrypting a multimedia file, the method including parsing the multimedia file to identify a media data portion; encrypting the media data portion; and, combining the encrypted media data portion with a non-encrypted non-media data portion. A method for playing a multimedia file is also provided herein for parsing the multimedia file to identify an unencrypted metadata portion; using the unencrypted metadata portion to locate a position of interest in the media file, the position of interest having an associated encrypted media data portion; and, decrypting the associated encrypted media data portion.

In another embodiment, a processor configured to implement a method for encrypting a multimedia file is described herein, the method including parsing the multimedia file to identify a media data portion; encrypting the media data portion; and, combining the encrypted media data portion with a non-encrypted non-media data portion. In this other embodiment, a processor configured to implement a method for playing a multimedia file is also provided herein, the method including parsing the multimedia file to identify an unencrypted metadata portion; using the unencrypted metadata portion to locate a position of interest in the media file, the position of interest having an associated encrypted media data portion; and, decrypting the associated encrypted media data portion.

In yet another embodiment, a computer readable medium having instructions stored thereon, the stored instructions, when executed by a processor, cause the processor to perform a method for encrypting a multimedia file is described herein, the method including parsing the multimedia file to identify a media data portion; encrypting the media data portion; and, combining the encrypted media data portion with a non-encrypted non-media data portion. In this other embodiment, a computer readable medium having instructions stored thereon, the stored instructions, when executed by a processor, cause the processor to perform a method for playing a multimedia file is also provided herein, the method including parsing the multimedia file to identify an unencrypted metadata portion; using the unencrypted metadata portion to locate a position of interest in the media file, the position of interest having an associated encrypted media data portion; and, decrypting the associated encrypted media data portion.

In yet another embodiment, an apparatus for encrypting a multimedia file is described herein, the apparatus including means for parsing the multimedia file to identify a media data portion; means for encrypting the media data portion; and, means for combining the encrypted media data portion with a non-encrypted non-media data portion. In this other embodiment, an apparatus for playing a multimedia file is also described herein having means for parsing the multimedia file to identify an unencrypted metadata portion; means for using the unencrypted metadata portion to locate a position of interest in the media file, the position of interest having an associated encrypted media data portion; and, means for decrypting the associated encrypted media data portion.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

The embodiments described herein provide a method for encrypting only the "content" portion of the data of any codec transport stream and leaving the meta-content, which is used to locate and playback the content, intact. For example, in one embodiment, only the video content portion is encrypted. As a result, the effects of any error or byte expansion/contraction of data should be minimized and thereby affect a small portion of the playback of the multimedia.

The following description assumes the codec used to store the multimedia content is compliant with the MPEG4 standard as promulgated by the Moving Picture Experts Group (MPEG), a working group of the International Standardization Organization/International Electrotechnical Commission, Joint Technical Committee 1 (ISO/IEC JTC1). The ISO/IEC standards are denoted with MPEG-x (e.g., MPEG-1, MPEG-2 and MPEG-4) and the MPEG-4 standard is described in ISO/IEC 14496-2.

Figure 1:
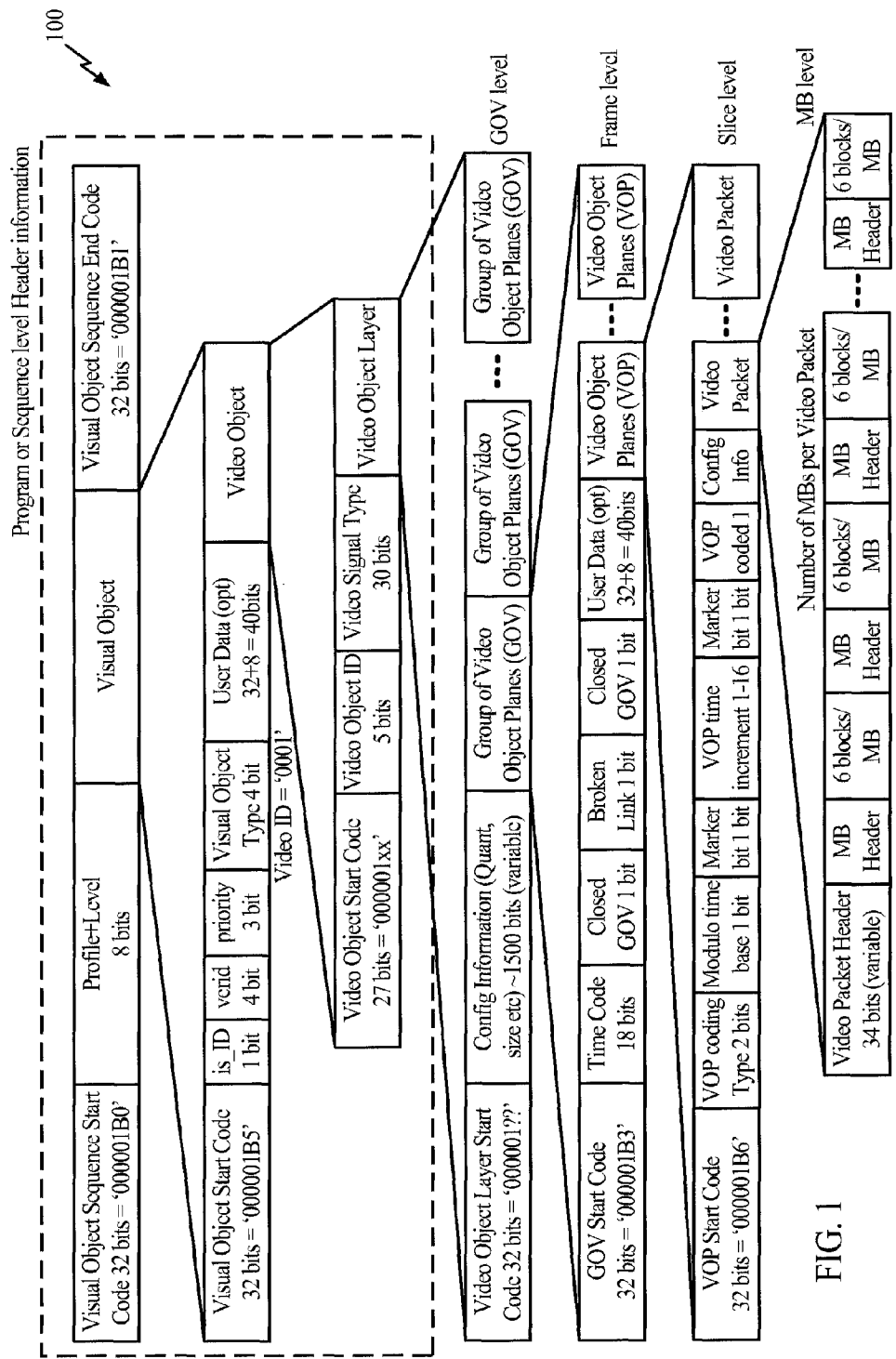
FIG. 1 is a figure illustrating an organization of an exemplary video bitstream as defined by a standard codec.

With reference to FIG. 1, an MPEG4 file 100 consists of hierarchical atoms, including metadata and media atoms. Each atom itself can be composed of other atoms. The metadata and media data atoms can be present anywhere in the file. In general, the metadata atom (moov) is not essential and can be located either before or after the media data atoms in the file. Metadata typically constitute less than 5-10% of an MPEG4 file.

Figure 2:
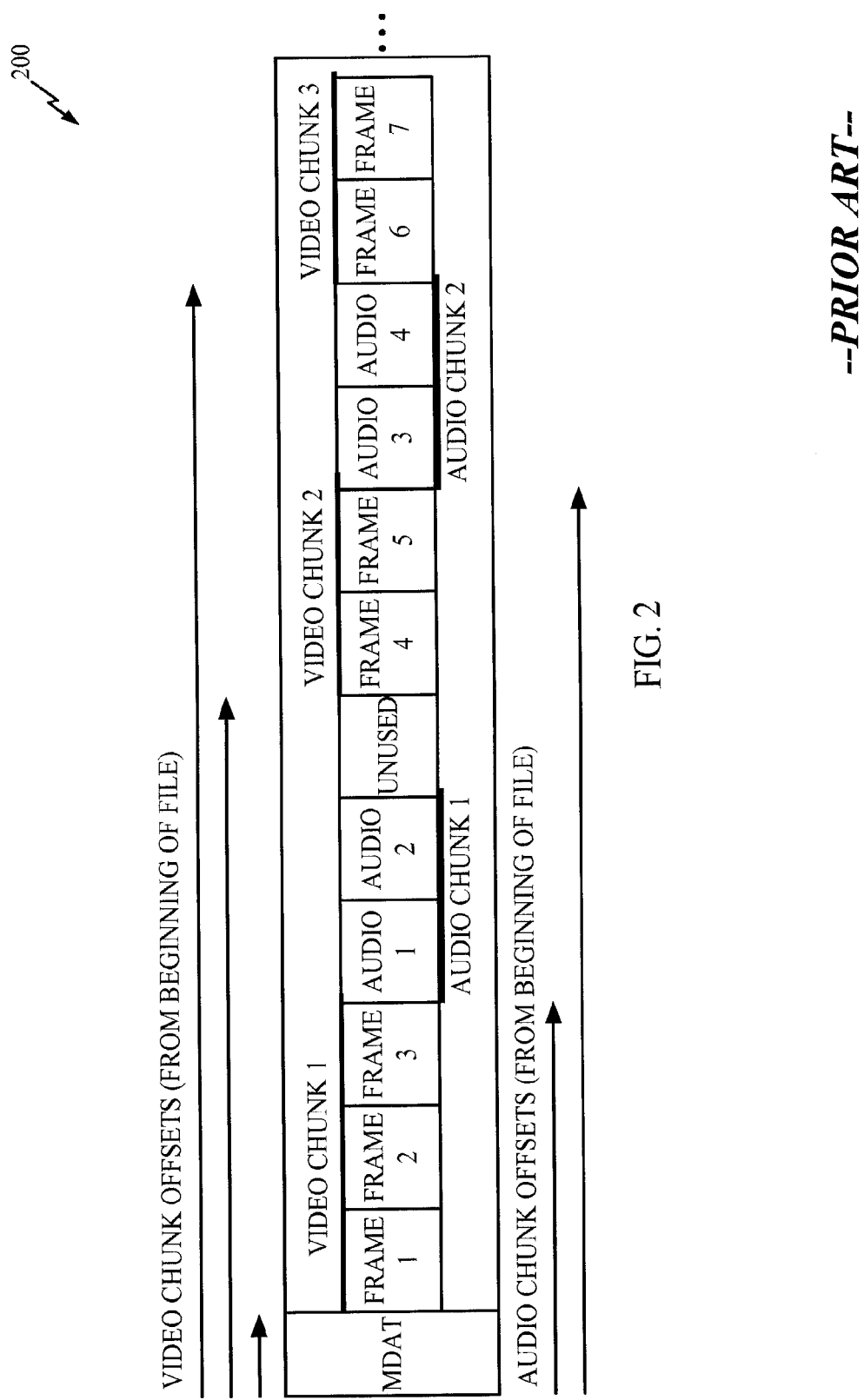
FIG. 2 is a figure illustrating a sample organization of video and audio samples into chunks and the chunk offsets.

Each atom itself has a type and a size field assigned it, from which a map of the contents of the file may be generated. This allows the parser of the multimedia player to quickly jump from one atom to the other. Each elementary stream, such as the audio stream or the video stream, will have its own mdat (media data) atom. With reference to FIG. 2, within the mdat atom, the media data 200 is organized in the form of chunks that are a collection of related samples. For example, a chunk of video data may include the first three video frames of a video sequence (e.g., frames 1, 2, and 3), while a chunk of audio data might have one or more audio samples in it. These chunks of media data are interspersed throughout the file.

The metadata atom contains information about the media in the file, the frames and their offsets. Specifically, there is a stbl or a sample table atom present within the moov atom. This stbl atom is further composed of the following table atoms:

stts: Maps time to sample numbers.
stsz: Specifies the size of samples.
stsc: Maps samples to chunks (basically indicates which sample occurs in which chunk).
stco: Provides the chunk offset within the file.
stsd: Sample description table that contains configuration information (VOL headers, etc.).

Together, these atoms provide the essential metadata required for parsing to the appropriate frame or audio sample to render it for playback, as further described below.

Many multimedia players are file-based, such that they take as input a filename or a buffer containing a multimedia file. The player performs a scan of the file metadata to load an internal table with frame offsets and timing information. The raw frames are fed to the codec (e.g., MPEG-4 codec) for decode and then rendered on the display by the player. The internal table is used to perform such functions as "quick" seeks to the appropriate position in the file during a fast-forward or a rewind, or "random access" playback from any point in the file. Such features are collectively referred to as "trick play" features.

To keep the internal tables compact, a variety of techniques are used. One that is used to compact the location and size information relies on the observation that several samples from the same track are often stored contiguously, even when data from various tracks is interleaved. This run of contiguous samples from a particular track is called a chunk. The sample-to-chunk table within the mandatory 'stsc' atom, provides the mapping from sample number to chunk indices. The (absolute) position of each chunk is recorded within the mandatory 'stco' atom, as a chunk offset (using 32 or 64 bits), which is measured from the beginning of the file in which the chunk resides. The length, in bytes, of each sample also is recorded, in the sample size table within the mandatory 'stsz' atom. Therefore, by using:

1. the data reference from the track,
2. the sample-to-chunk mapping,
3. the chunk offset, and
4. the sizes of the preceding samples in the same chunk, it is possible to find:
1. the data file containing the sample, which may be a file referenced by URL from the MP4 file itself,
2. the chunk (and its offset) within that file,
3. the offset of the sample within the chunk (from the sizes of the preceding samples in the same chunk), and,
4. the size of the sample itself.

FIG. 2 illustrates a simple example related to this process. Noting that both video frame and audio frame (sample) sizes are also know, any video or audio sample's boundaries can be easily calculated as absolute offsets. In such a player, the pre-constructed table framework does not allow a feed of encrypted files to the player. The player input is in the form of either a filename (char *) or a buffer that assumes the entire file resides in the unencrypted format in the buffer. Neither of these interfaces allow the player to decrypt the file in a "streaming" fashion (i.e., performing decryption while playing the file).

In one embodiment, streaming functionality may be added if the encryption/decryption system is modified so that encryption occurs at the frame or slice level in a file, leaving the metadata in the clear to support trick play. This "smart encryption" method allows the encryption system (e.g., the server) to be cognizant of the media format while encrypting the actual content and leaving the essential metadata and header data in the clear. Similarly, at the decryption system (e.g., the client), the metadata may be utilized to perform features such as trick play without further processing as it is unencrypted, and only the content portion of the stream or file has to be decrypted.

It should be noted that although each portion of the encryption scheme may be specifically described herein in terms of the media portion being separated from the non-media (e.g., the metadata), portion and then encrypted, in one embodiment, the encryption system will parse the media file/stream and, while parsing the media file/stream, encrypt only the media data portions and leave the metadata as is. Thus, in one embodiment the media portion does not have to be separated from the metadata, encrypted and then put back together (i.e., multiplexed) with metadata. In another embodiment, the media portion may be separated for processing and require multiplexing. In either scenario, to systems and processes external of the encryption system, the Both embodiments apply at the decryption portion of the scheme, as well.

Figure 3:
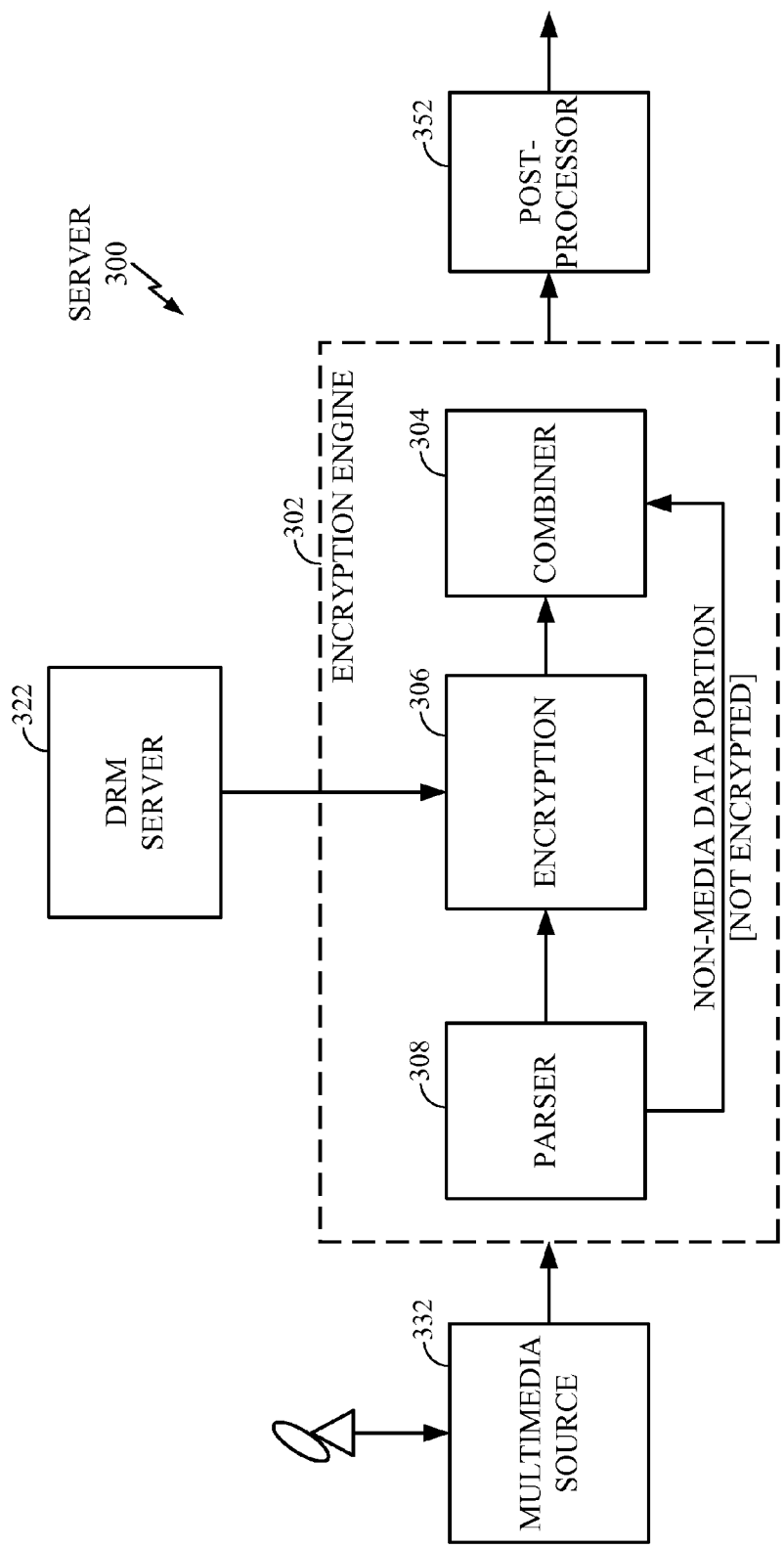
FIG. 3 is a block diagram of a server with an encryption engine configured to encrypt only a media portion of a multimedia content.

FIG. 3 illustrates a server 300 with an encryption engine 302 that includes a parser 308 that parses the incoming data from a multimedia source 332, which may be from a stream or a file, into media and non-media portions. An encryption processor 306, while parser 308 is parsing the incoming data, then encrypts only the media portions using information from a DRM server 322. A combiner 304 will combine the non-media portion (which is not encrypted) and encrypted media portion and send it to a post processor 352 for transmission to a client 400, as shown in FIG. 4.

Smart encryption would require the encryption engine 302 to be aware of the various media formats to be supported by the system so that it would only encrypt just the frame data, leaving the headers in the clear. For example, in the case of MPEG4, as illustrated in FIG. 1, the system would only encrypt the VOP data and leave the GOV and VOP headers in the clear. Further, assuming that the video bitstream is a standard MP4 file, where the stbl metadata atom is compulsory, the encryption engine would not have to parse for frame or audio-sample start codes to get to the media data. Instead, the encryption engine would use the information in the stbl metadata atom to parse to the appropriate position in the file to get to the frame or audio sample data.

Figure 4:
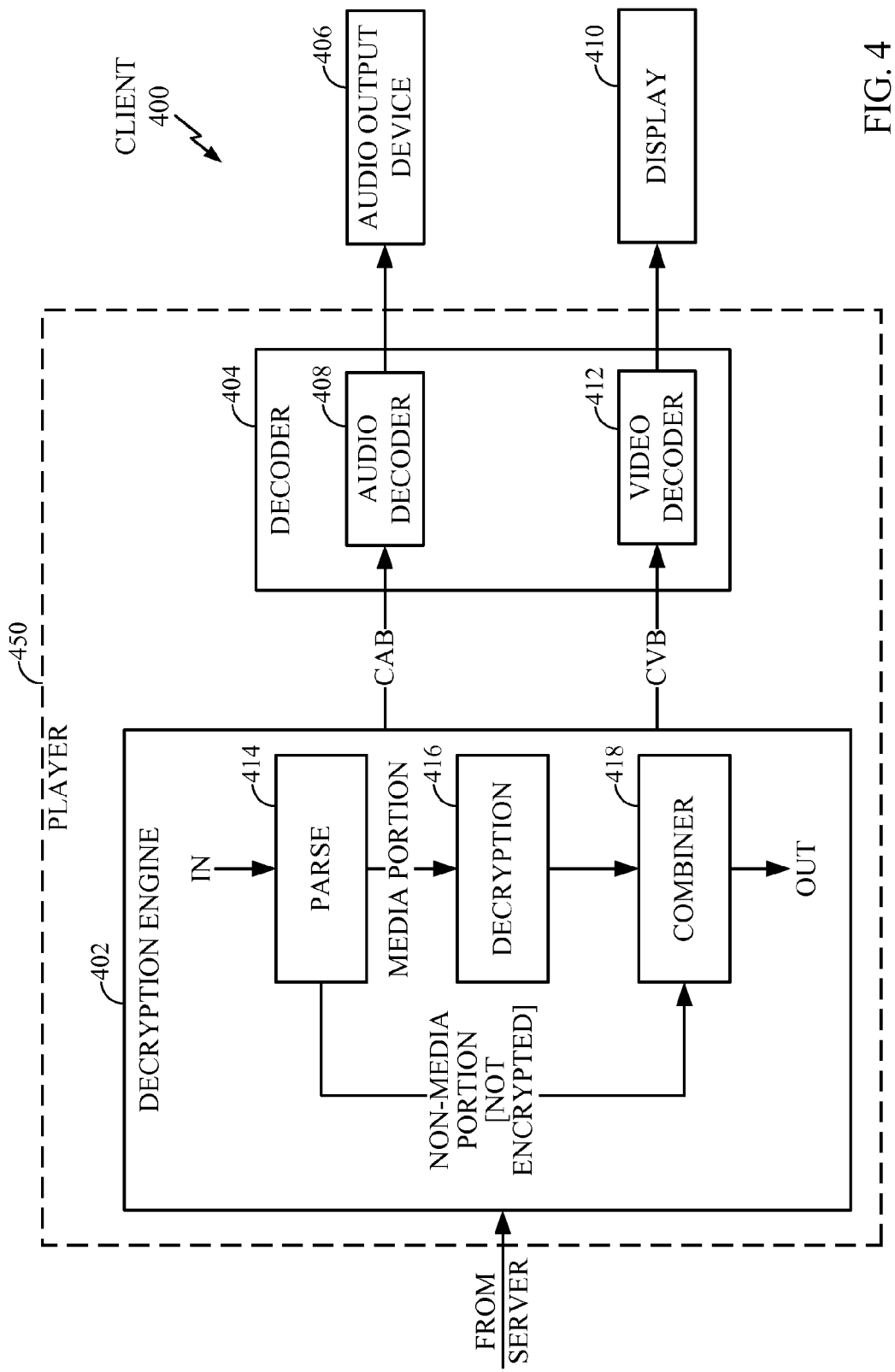
FIG. 4 is a block diagram of a client with a player to decrypt and playback the encrypted media portion of the multimedia content.

FIG. 4 illustrates a client 400 that receives the multimedia file from server 300 and decrypts the relevant portions of the received file for rendering and playback. A player 450 would be able to construct an internal table without any decryption because the header information of the file is all in the clear. Player 450 would include a decryption engine 402, and a parser 414 in decryption engine 402 would pass the portion of the file that is encrypted to a decryption unit 416 along with the key for decryption before sending the frames to the MP4 codec. Specifically, parser 414 extracts the data for the encrypted frames and sends them to decryption unit 416. The non-media portion, which was not encrypted by server 300, would be directly sent to a combiner 418 for combination with the decrypted media portion. A decoder 404, which includes an audio decoder 408 and a video decoder 412, would decode the coded audio bitstream (CAB) and the coded video bitstream (CVB) for rendering on an audio output device 406 and a display 410, respectively. It should be noted that player 450 may have more components than are illustrated in FIG. 4.

In the above embodiment, the file would look like a normal MPEG4 file to player 450 because the headers are not encrypted. The creation of the internal table would not require any decryption to happen, so decryption will happen only when the frames are being fed to the codec. Of course, both encryption/decryption engines have to be cognizant of the file format to recognize the header. Thus, there would be changes needed for every additional media format the system has to support. Further, there will be extra processing load on encryption engine to enable encryption at the frame level—parsing stbl atoms, looking for media data etc.

Figure 5:
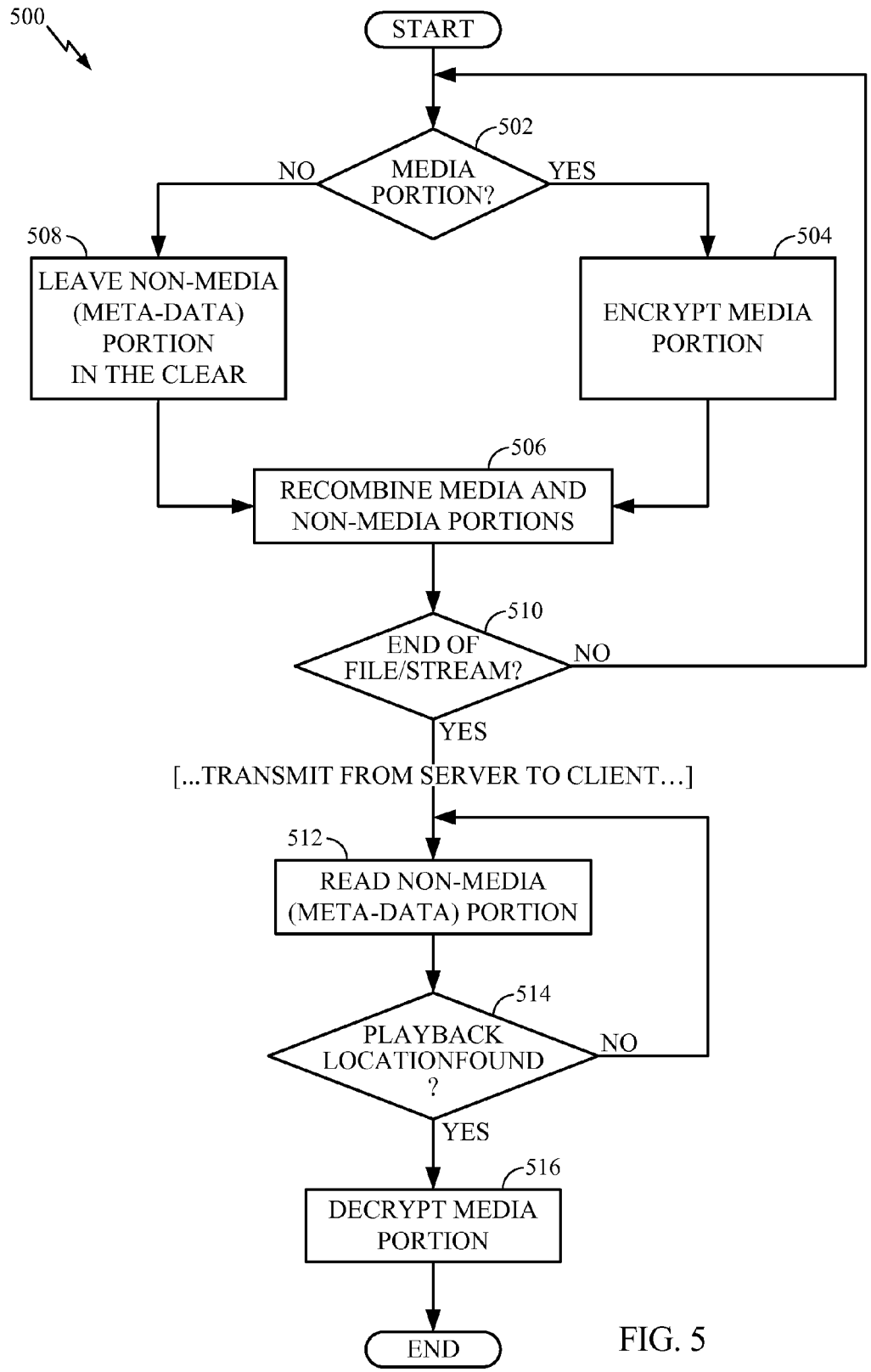
FIG. 5 is a flow diagram of an operation of the encryption engine.

FIG. 5 illustrates a flow diagram of an exemplary embodiment of the operation of the encryption/decryption process 500, where, in block 502, parser 308 of encryption engine 302 determines if the data being received from a file or a stream belongs to a media portion or a non-media portion. If so, then operation continues with block 504, where encryption unit 306 encrypts the media portion. Otherwise, operation proceeds with block 508, where the non-media portion of the data is not encrypted (i.e., left in the clear). In block 506, the media and non-media portions are combined and read out to the storage location of the file (such as a storage unit on server 300), or streamed out to client 400. If the complete file or stream has not been processed, then operation returns to block 502. Otherwise, the data is transmitted to client 400.

Once the data has been transmitted to client 400, either in a file or as part of a stream, during playback client 400 can read the metadata portion in block 512 and, in block 514, determine if the playback location has been found. If so, then operation continues with block 516, where the media portion is read and decrypted. The decrypted portion is then presented to decoder 404 for playback, as described above.

Figure 6:
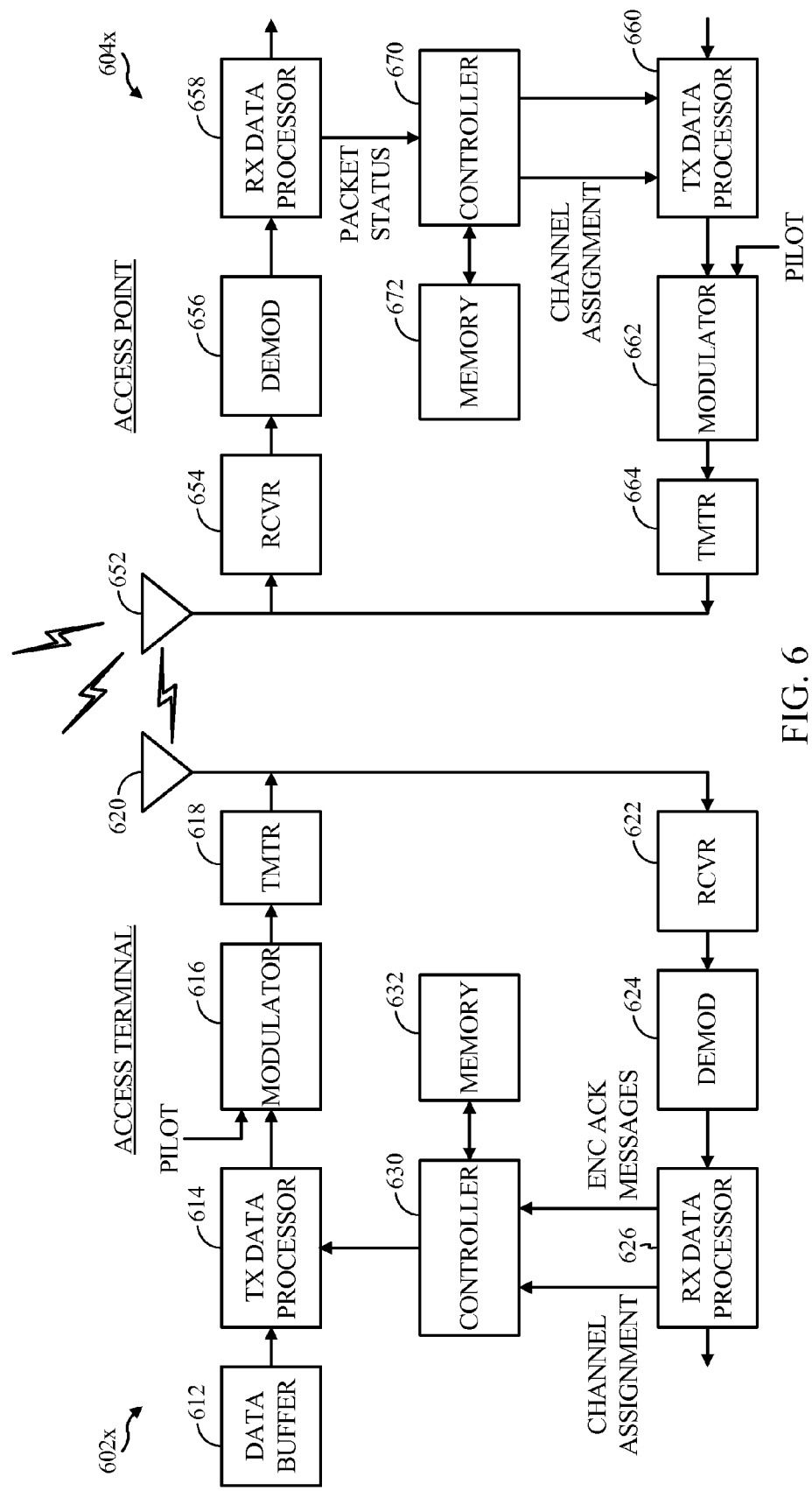
FIG. 6 is a block diagram of an access point and an access terminal usable for implementing the features described herein.

FIG. 6 shows a block diagram of an access point 604$x$ and an access terminal 602$x$ that may be utilized to transmit and receive, respectively data encrypted using the methods and apparatus described herein. As described herein, an "access terminal" refers to a device providing voice and/or data connectivity to a user. The access terminal may be connected to a computing device such as a laptop computer or desktop computer, or it may be a self-contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem. Further, an "access point" as used herein refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

For the reverse link, at access terminal 602$x$, a transmit (TX) data processor 614 receives traffic data from a data buffer 612, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 616 receives the data symbols, pilot symbols, and possibly signaling for the reverse link, performs (e.g., OFDM) modulation and/or other processing as specified by the system, and provides a stream of output chips. A transmitter unit (TMTR) 618 processes (e.g., converts to analog, filters, amplifies, and frequency upconverts) the output chip stream and generates a modulated signal, which is transmitted from an antenna 620.

At access point 604$x$, the modulated signals transmitted by access terminal 602$x$ and other terminals in communication with access point 604$x$ are received by an antenna 652. A receiver unit (RCVR) 654 processes (e.g., conditions and digitizes) the received signal from antenna 652 and provides received samples. A demodulator (Demod) 656 processes (e.g., demodulates and detects) the received samples and provides detected data symbols, which are noisy estimate of the data symbols transmitted by the terminals to access point 604$x$. A receive (RX) data processor 658 processes (e.g., symbol demaps, deinterleaves, and decodes) the detected data symbols for each terminal and provides decoded data for that terminal.

For the forward link, at access point 604x, traffic data is processed by a TX data processor 660 to generate data symbols. A modulator 662 receives the data symbols, pilot symbols, and signaling for the forward link, performs (e.g., OFDM) modulation and/or other pertinent processing, and provides an output chip stream, which is further conditioned by a transmitter unit 664 and transmitted from antenna 652. The forward link signaling may include power control commands generated by a controller 670 for all terminals transmitting on the reverse link to access point 604x. At access terminal 602x, the modulated signal transmitted by access point 604x is received by antenna 620, conditioned and digitized by a receiver unit 622, and processed by a demodulator 624 to obtain detected data symbols. An RX data processor 1026 processes the detected data symbols and provides decoded data for the terminal and the forward link signaling. Controller 630 receives the power control commands, and controls data transmission and transmit power on the reverse link to access point 604x. Controllers 630 and 670 direct the operation of access terminal 602x and access point 604x, respectively. Memory units 632 and 672 store program codes and data used by controllers 630 and 670, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments described herein. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for encrypting a multimedia file, comprising:
   Receiving the multimedia file;
   parsing the multimedia file into separate media and non-media portions to identify a media data portion, wherein the media data portion includes a plurality of video frames;
   encrypting the media data portion on a video frame-by-video frame basis such that each of the plurality of video frames is encrypted regardless of a size of the video frame; and
   combining the encrypted media data portion with a non-encrypted non-media data portion; and
   outputting the encrypted media data portion combined with the non-encrypted non-media data portion.

2. The method of claim 1, wherein parsing the multimedia file to identify the media data portion comprises:
   determining a file format of the multimedia file; and
   based on the determined file format, identifying the media data portions of the multimedia file.

3. The method of claim 1, wherein the media data portion further includes a plurality of audio samples, and the method further comprises encrypting the media data portion on an audio sample-by-audio sample basis.

4. A method for playing a multimedia file, comprising:
receiving the multimedia file comprising an encrypted media portion combined with a non-encrypted non-media portion;
parsing the multimedia file to separate the encrypted media and non-encrypted non-media portions to identify an unencrypted metadata portion;
using the unencrypted metadata portion to locate a position of interest in the multimedia file, the position of interest having an associated encrypted media data portion that includes a plurality of video frames, wherein each of the plurality of video frames is encrypted regardless of a size of the video frame; and
decrypting the associated encrypted media data portion on a video frame basis;
combining the decrypted associated media data portion with the unencrypted metadata portion; and
decoding the decrypted associated media data portion combined with the unencrypted metadata portion.

5. The method of claim 4, wherein parsing the multimedia file to identify the metadata portion comprises:
determining a file format of the multimedia file; and
based on the determined file format, identifying a non-encrypted non-media portion of the multimedia file.

6. The method of claim 4, wherein using the unencrypted metadata portion to locate the position of interest in the multimedia file comprises:
building a table of video frame offsets and timing information; and
determining the location of a video frame in the multimedia file.

7. The method of claim 4, wherein using the unencrypted metadata portion to locate the position of interest in the multimedia file comprises: determining a location of a video frame in the multimedia file by:
mapping the video frame to a chunk; and
determining an offset of the video frame within the chunk.

8. A hardware processor configured to implement a method for encrypting a multimedia file, the method comprising:
receiving the multimedia file;
parsing the multimedia file into separate media and non-media portions to identify a media data portion, wherein the media data portion includes a plurality of video frames;
encrypting the media data portion on a video frame-by-video frame basis such that each of the plurality of video frames is encrypted regardless of a size of the video frame; and
combining the encrypted media data portion with a non-encrypted non-media data portion; and
outputting the encrypted media data portion combined with the non-encrypted non-media data portion.

9. The processor of claim 8, wherein parsing the multimedia file to identify the media data portion comprises:
determining a file format of the multimedia file; and
based on the determined file format, identifying the media data portions of the multimedia file.

10. The processor of claim 8, wherein the media data portion further includes a plurality of audio samples, and the method further comprises encrypting the media data portion on an audio sample-by-audio sample basis.

11. A hardware processor configured to implement a method for playing a multimedia file, the method comprising:
receiving the multimedia file comprising an encrypted media portion combined with a non-encrypted non-media portion;
parsing the multimedia file to separate the encrypted media and the non-encrypted non-media portions to identify an unencrypted metadata portion;
using the unencrypted metadata portion to locate a position of interest in the multimedia file, the position of interest having an associated encrypted media data portion that includes a plurality of video frames, wherein each of the plurality of video frames is encrypted regardless of a size of the video frame;
decrypting the associated encrypted media data portion on a video frame basis; and
combining the decrypted media data portion with the unencrypted metadata portion.

12. The processor of claim 11, wherein parsing the multimedia file to identify the metadata portion comprises:
determining a file format of the multimedia file; and
based on the determined file format, identifying a non-encrypted non-media portion of the multimedia file.

13. The processor of claim 11, wherein using the unencrypted metadata portion to locate the position of interest in the multimedia file comprises:
building a table of video frame offsets and timing information; and
determining the location of a video frame in the multimedia file.

14. The processor of claim 11, wherein using the unencrypted metadata portion to locate the position of interest in the multimedia file comprises:
determining a location of a video frame in the multimedia file by:
mapping the video frame to a chunk; and
determining an offset of the video frame within the chunk.

15. A non-transitory computer readable medium having instructions stored thereon, the stored instructions, when executed by a processor, cause the processor to perform a method for encrypting a multimedia file, the non-transitory computer readable medium comprising:
at least one instruction executable for receiving the multimedia file;
at least one instruction executable for parsing the multimedia file into separate media and non-media portions to identify a media data portion, wherein the media data portion includes a plurality of video frames;
at least one instruction executable for encrypting the media data portion on a video frame-by-video frame basis such that each of the plurality of video frames is encrypted regardless of a size of the video frame;
at least one instruction executable for combining the encrypted media data portion with a non-encrypted non-media data portion; and
at least one instruction executable for outputting the encrypted media data portion combined with the non-encrypted non-media portion.

16. The non-transitory computer readable medium of claim 15, wherein the at least one instruction executable for parsing the multimedia file to identify the media data portion comprises:
at least one instruction executable for determining a file format of the multimedia file; and
based on the determined file format, at least one instruction executable for identifying the media data portions of the multimedia file.

17. The non-transitory computer readable medium of claim 15, wherein the media data portion further includes a plurality of audio samples, and further comprising at least one instruction executable for encrypting the media data portion on an audio sample-by-audio sample basis.

18. A non-transitory computer readable medium having instructions stored thereon, the stored instructions, when executed by a processor, cause the processor to perform a method for playing a multimedia file, the non-transitory computer readable medium comprising:
 at least one instruction executable for receiving the multimedia file comprising an encrypted media portion and a non-encrypted media portion;
 at least one instruction executable for parsing the multimedia file to separate the encrypted media and the non-encrypted non-media portions to identify an unencrypted metadata portion;
 at least one instruction executable for using the unencrypted metadata portion to locate a position of interest in the multimedia file, the position of interest having an associated encrypted media data portion that includes a plurality of video frames, wherein each of the plurality of video frames is encrypted regardless of a size of the video frame;
 at least one instruction executable for decrypting the associated encrypted media data portion on a video frame basis;
 combining the decrypted media data portion with the unencrypted metadata portion; and
 decoding the decrypted data portion combined with the unencrypted metadata portion.

19. The non-transitory computer readable medium of claim 18, wherein the at least one instruction executable for parsing the multimedia file to identify the metadata portion comprises:
 at least one instruction executable for determining a file format of the multimedia file; and
 based on the determined file format, at least one instruction executable for identifying a non-encrypted non-media portion of the multimedia file.

20. The non-transitory computer readable medium of claim 18, wherein the at least one instruction executable for using the unencrypted metadata portion to locate the position of interest in the multimedia file comprises:
 at least one instruction executable for building a table of video frame offsets and timing information; and
 at least one instruction executable for determining the location of a video frame in the multimedia file.

21. The non-transitory computer readable medium of claim 18, wherein the at least one instruction executable for using the unencrypted metadata portion to locate the position of interest in the multimedia file comprises:
 at least one instruction executable for determining a location of a video frame in the multimedia file by:
  mapping the video frame to a chunk; and
  determining an offset of the video frame within the chunk.

22. An apparatus for encrypting a multimedia file, comprising: means for receiving the multimedia file;
 means for parsing the multimedia file into separate media and non-media portions to identify a media data portion, wherein the media data portion includes a plurality of video frames;
 means for encrypting the media data portion on a video frame-by-video frame basis such that each of the plurality of video frames is encrypted regardless of a size of the video frame;
 means for combining the encrypted media data portion with a non-encrypted non-media data portion; and
 means for outputting the encrypted media data portion combined with the non-encrypted media data portion.

23. The apparatus of claim 22, wherein the means for parsing the multimedia file to identify the media data portion comprises:
 means for determining a file format of the multimedia file; and
 means for based on the determined file format, identifying the media data portions of the multimedia file.

24. The apparatus of claim 22, wherein the media data portion further includes a plurality of audio samples, and the apparatus further comprising means for encrypting the media data portion on an audio sample-by-audio sample basis.

25. An apparatus for playing a multimedia file, comprising:
 means for receiving the multimedia file comprising an encrypted media portion and a non-encrypted media portion;
 means for parsing the multimedia file to separate the encrypted media and the unencrypted non-media portions to identify an unencrypted metadata portion;
 means for using the unencrypted metadata portion to locate a position of interest in the multimedia file, the position of interest having an associated encrypted media data portion that includes a plurality of video frames, wherein each of the plurality of video frames is encrypted regardless of a size of the video frame; and
 means for decrypting the associated encrypted media data portion on a video frame basis and
 means for combining the decrypted associated media data portion with the unencrypted non-media portion; and
 means for decoding the decrypted associated media data portion combined with the unencrypted non-media portion.

26. The apparatus of claim 25, wherein the means for parsing the multimedia file to identify the metadata portion comprises:
 means for determining a file format of the multimedia file; and
 means for identifying a non-encrypted non-media portion of the multimedia file based on the determined file format.

27. The apparatus of claim 25, wherein the means for using the unencrypted metadata portion to locate the position of interest in the multimedia file comprises:
 means for building a table of video frame offsets and timing information; and
 means for determining the location of a video frame in the multimedia file.

28. The apparatus of claim 25, wherein the means for using the unencrypted metadata portion to locate the position of interest in the multimedia file comprises:
 means for determining a location of a video frame in the multimedia file comprising:
  means for mapping the video frame to a chunk; and
  means for determining an offset of the video frame within the chunk.

29. An apparatus for encrypting a multimedia file, comprising:
 a parser configured to receive the multimedia file and parse the received multimedia file into separate media and non-media portions to identify a media data portion, wherein the media data portion includes a plurality of video frames;
 an encryption processor configured to encrypt the media data portion on a video frame-by-video frame basis, such that each of the plurality of video frames is encrypted regardless of a size of the video frame;

a combiner configured to combine the encrypted media data portion with the non-encrypted non-media data portion; and an output device for outputting the encrypted media data portion combined with the non-encrypted non-media portion.

30. The apparatus of claim 29, wherein the parser is further configured to:

determine a file format of the multimedia file; and based on the determined file format, identify the media data portions of the multimedia file.

31. The apparatus of claim 29, wherein the media data portion further includes a plurality of audio samples, and wherein the encryption processor is further configured to encrypt the media data portion on an audio sample-by-audio sample basis.

32. An apparatus for playing a multimedia file, comprising:

a parser configured to receive the multimedia file comprising an encrypted media portion and a non-encrypted media portion and parse the received multimedia file to separate the encrypted media and the non-encrypted non-media portions to identify an unencrypted metadata portion, and to locate a position of interest in the multimedia file using the unencrypted metadata portion, wherein the position of interest comprises an associated encrypted media data portion-that includes a plurality of video frames, and wherein each of the plurality of video frames is encrypted regardless of a size of the video frame;

a decryption processing device configured to decrypt the associated encrypted media data portion on a video frame basis; and a combiner for combining the decrypted non-encrypted portion.

33. The apparatus of claim 32, wherein the parser is further configured to:

determine a file format of the multimedia file; and based on the determined file format, identify the non-encrypted non-media portion of the multimedia file.

34. The apparatus of claim 32, wherein the parser is further configured to:

build a table of video frame offsets and timing information; and determine the location of a video frame in the multimedia file.

35. The apparatus of claim 32, wherein the parser is further configured to:

determine a location of a video frame in the multimedia file by:

mapping the video frame to a chunk; and determining an offset of the video frame within the chunk.

36. The method of claim 1, wherein each of the plurality of video frames is a Video Object Plane (VOP).

37. The method of claim 4, wherein each of the plurality of video frames is a Video Object Plane (VOP).

38. The processor of claim 8, wherein each of the plurality of video frames is a Video Object Plane (VOP).

39. The processor of claim 11, wherein each of the plurality of video frames is a Video Object Plane (VOP).

40. The non-transitory computer readable medium of claim 15, wherein each of the plurality of video frames is a Video Object Plane (VOP).

41. The non-transitory computer readable medium of claim 18, wherein each of the plurality of video frames is a Video Object Plane (VOP).

42. The apparatus of claim 22, wherein each of the plurality of video frames is a Video Object Plane (VOP).

43. The apparatus of claim 25, wherein each of the plurality of video frames is a Video Object Plane (VOP).

44. The apparatus of claim 29, wherein each of the plurality of video frames is a Video Object Plane (VOP).

45. The apparatus of claim 32, wherein each of the plurality of video frames is a Video Object Plane (VOP).

* * * * *